United States Patent [19]

Fuss

[11] Patent Number: 5,286,321
[45] Date of Patent: Feb. 15, 1994

[54] SYSTEM AND METHOD FOR DENSIFYING EXPANDED PLASTIC FOAM MATERIALS

[75] Inventor: Gunter G. Fuss, San Mateo, Calif.

[73] Assignee: Free-Flow Packaging Corporation, Redwood City, Calif.

[21] Appl. No.: 68,293

[22] Filed: May 27, 1993

Related U.S. Application Data

[63] Continuation of Ser. No. 782,245, Oct. 25, 1991, abandoned, which is a continuation-in-part of Ser. No. 632,951, Dec. 21, 1990, abandoned.

[51] Int. Cl.⁵ .............................................. B29B 13/02
[52] U.S. Cl. ........................................... 156/84; 156/85; 156/94; 156/497; 156/499; 264/37; 264/230; 264/321; 264/322; 264/342 R; 264/DIG. 7; 264/DIG. 69; 264/DIG. 71; 425/4 C
[58] Field of Search ............... 156/62.2, 84, 85, 497, 156/499, 94; 264/37, 230, 321, 322, 342 R, DIG. 7, DIG. 10, DIG. 69, DIG. 71, DIG. 84; 24/152 A, 188 A, 259.1; 425/4 C, 37, 817 R, 817 C, DIG. 46

[56] References Cited

U.S. PATENT DOCUMENTS

| | | | |
|---|---|---|---|
| Re. 32,039 | 11/1985 | Pettingell | 264/321 |
| 3,263,278 | 8/1966 | Hendry . | |
| 3,398,676 | 8/1968 | Theobald et al. . | |
| 3,399,426 | 9/1968 | Weasel | 264/DIG. 69 |
| 3,450,529 | 6/1969 | MacDonald . | |
| 3,475,525 | 10/1969 | Peters | 264/101 |
| 3,589,276 | 6/1971 | Swallert . | |
| 3,616,162 | 11/1971 | Noziere | 425/4 C |
| 3,736,082 | 5/1973 | Wick et al. | 425/4 C |
| 3,746,610 | 7/1973 | Hoegger | 264/DIG. 7 |
| 3,755,520 | 8/1973 | Cogliano | 264/DIG. 71 |
| 3,827,213 | 8/1974 | Matzinger . | |
| 3,871,291 | 3/1975 | Lassiter . | |
| 3,911,808 | 10/1975 | Lassiter et al. . | |
| 3,912,901 | 10/1975 | Strella et al. . | |
| 3,922,131 | 11/1975 | Stegmeier | 425/223 |
| 3,956,981 | 5/1976 | Pitt . | |
| 4,033,804 | 7/1977 | Baldyga | 264/DIG. 71 |
| 4,042,658 | 8/1977 | Collins | 264/DIG. 71 |
| 4,099,457 | 7/1978 | Hyden . | |
| 4,100,849 | 7/1978 | Pelton . | |
| 4,229,398 | 10/1980 | Harvey . | |
| 4,254,068 | 3/1981 | Otsuka | 264/DIG. 69 |
| 4,504,436 | 3/1985 | Louvier | 264/DIG. 69 |
| 4,653,396 | 3/1987 | Wennerberg . | |
| 4,661,290 | 4/1987 | Sauda et al. . | |
| 4,666,646 | 5/1987 | Chang | 264/DIG. 69 |
| 4,700,622 | 10/1987 | Satake . | |
| 4,834,914 | 5/1989 | Jackson . | |

FOREIGN PATENT DOCUMENTS

| | | |
|---|---|---|
| 342958 | 8/1977 | Austria . |
| 2233161 | 1/1975 | France . |
| 9107264 | 5/1991 | PCT Int'l Appl. . |

*Primary Examiner*—Caleb Weston
*Attorney, Agent, or Firm*—Flehr, Hohbach, Test, Albritton & Herbert

[57] ABSTRACT

System and method for densifying expanded thermoplastic foam materials such as loose fill packing materials, larger blocks of such materials, and food and beverage service items to reduce the volume of such materials for recycling or disposal. The material is heated to soften the material and expel gas from cells within the material and thereby shrink the material to a reduced volume. In some embodiments, and the material is further densified by compacting the heat softened material to further reduce the volume.

18 Claims, 2 Drawing Sheets

SYSTEM AND METHOD FOR DENSIFYING EXPANDED PLASTIC FOAM MATERIALS

This is a continuation of U.S. application Ser. No. 07/782,245, filed Oct. 25, 1991 abandoned, which is turn is a continuation-in-part of U.S. application Ser. No. 07/632,951, filed Dec. 21, 1990 abandoned.

This invention pertains generally to expanded plastic foam materials and, more particularly, to a system and method for densifying expanded thermoplastic foams for recycling or disposal.

Loose fill packing materials, such as so-called "Styrofoam peanuts", which are widely used in the packing and shipment of delicate items present a problem from the standpoint of disposal. A similar problem is presented by disposable food and drink service items of the type commonly used in the fast food industry, e.g. cups, plates, bowls and the "clamshell" containers in hot food products such as hamburgers, french fries and pizza are sometimes served. These materials occupy relatively large volumes and are commonly made of expanded thermoplastic foams such as polystyrene or polyethylene which do not make good land fill and are not biodegradable. A similar problem also exists in the disposal of larger blocks of expanded foam such as the molded blocks which are sometimes used in the packaging of larger products.

Largely because of the problems in disposing of loose fill packing materials and food and drink containers made of expanded foam, there has been some interest in recycling them. However, this has generally not been feasible from an economic standpoint because of the expense of transporting the relatively large volumes of material involved.

It is in general an object of the invention to provide a system and method for densifying expanded plastic foams, such as loose fill packing materials, food and beverage service items, and larger blocks of such materials, to make it easier to recycle and/or dispose of them.

Another object of the invention is to provide a system and method of the above character which are economical and efficient in operation.

These and other objects are achieved in accordance with the invention by heating the expanded foam material to soften the material and expel gas from cells within the material to shrink the material to a reduced volume. In some embodiments, and the material is further densified by compacting the heat softened material to further reduce the volume of the material.

The types of materials which can be densified in accordance with the invention include all types of thermoplastic foams, including polystyrene foams and polyethylene foams. These can be in any form such as loose fill packing materials, food and beverage service items, blocks and the like. In the case of loose fill packing materials, the individual particles or pieces of the material can have a wide variety of shapes or forms, although the invention is particularly effective with materials formed in the shape of a three dimensional figure eight as shown in U.S. Pat. No. 3,855,053. In the case of food or beverage service items and larger blocks, the materials are advantageously broken into pieces about three-quarters of an inch in diameter before being processed.

Thermoplastics of the type which are advantageously densified in accordance with the invention have a cellular structure and in their foamed or expanded state typically have cell sizes ranging from about 0.001 to about 0.1 inch, void spaces occupying from about 25 to about 85 percent of the total volume of the foam, and a foam density ranging from about 0.15 to about 1.5 pounds per cubic foot.

Figure 1:
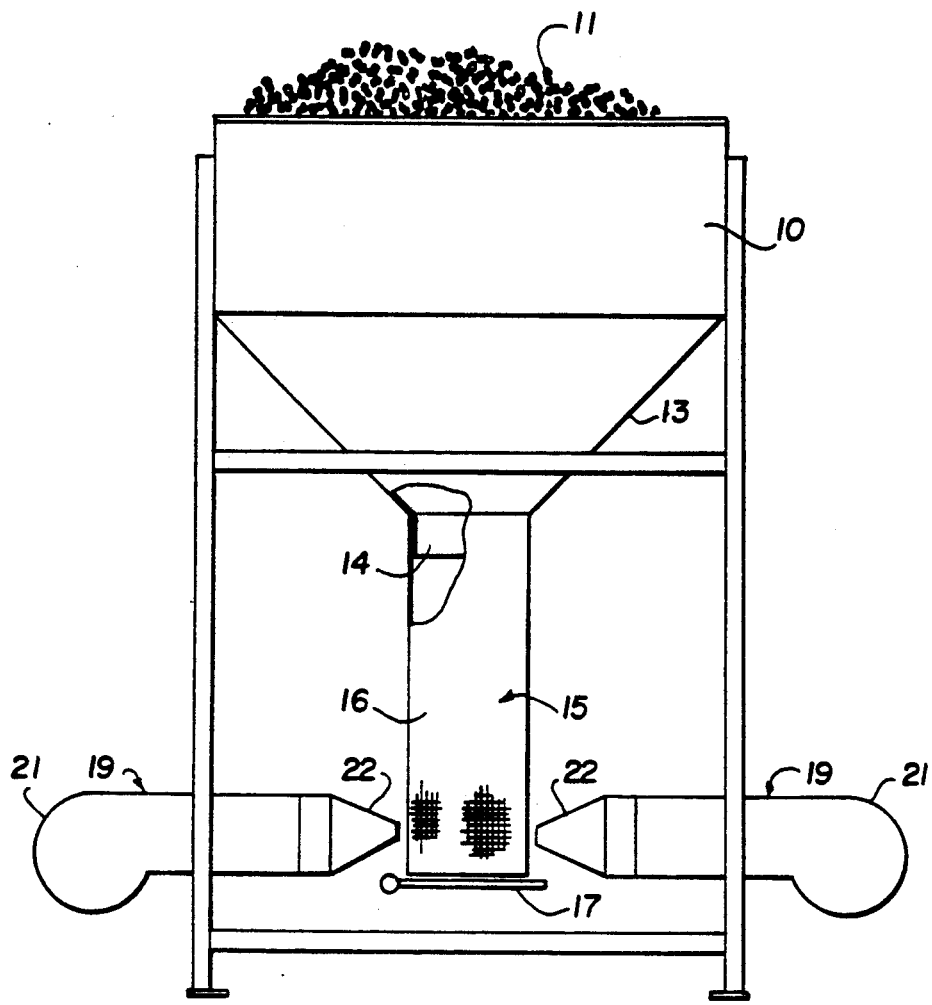
FIG. 1 is a side elevational view, partly broken away, of one embodiment of a system according to the invention.

As illustrated in FIG. 1, the system includes a hopper 10 having an open upper side for receiving the material 11 to be densified. The hopper has a rectangular configuration in plan view, with a sloping bottom wall 13 and a discharge opening or outlet 14 at the lower end of the bottom wall.

A chute 15 having a perforate side wall 16 extends in a downward direction from the outlet of the hopper. The chute is fabricated of a material having a relatively low thermal conductivity to which the packing material does not readily adhere when heated, and in one presently preferred embodiment, it is fabricated of a fiberglass mesh which is coated with Teflon (polytetrafluoroethylene). The openings in the mesh are smaller than the material to be densified so the material will not pass through the mesh.

A pivotally mounted door 17 forms a closure at the lower end of the chute and is movable between a horizontal or closed position and a vertical or open position. In the closed position, this door prevents the unprocessed particles of material from passing through the chute without being processed.

Means is provided for heating the material in the lower portion of the chute to a temperature on the order of 300° to 350° F. In the embodiment illustrated, this means includes a pair of hot air blowers 19 positioned on opposite sides of the chute toward the lower end thereof. Each of these heat sources includes an electrically energized heating element (not shown), a blower 21 and a discharge nozzle 22 for directing the heated air through the chute in a transverse direction. It is important that the dimensions of the chute and the amount of air discharged from the heat sources be such that the hot air reaches the material in the center of the chute as well as near the sides, and in one presently preferred embodiment, the chute has a width on the order of 6 inches, a depth on the order of 12 inches, and a height on the order of 18 inches, with the heat source nozzles and running the full depth of the chute and being positioned a few inches above the closure door at the bottom of the chute. With the nozzles so positioned, the hot air only needs to travel about three inches through the material to reach all of the particles, thereby assuring relatively uniform heating of the material.

Operation and use of the system of FIG. 1, and therein the method of the invention, are as follows. Door 17 is closed, and a measured quantity or batch of the material to be processed is poured into the hopper and flows by gravity into the chute. The heat sources are energized, and the hot air from the sources passes through the material in the lower portion of the chute, softening the material and allowing the gas to escape from the cells of the material. This causes the material to shrink to a reduced volume, and as it does, the material above it moves into to the heat zone and is likewise shrunk. The shrunken material collects in the form of a heat softened mass below the heat source nozzles in the lower portion of the chute, and when all of the material in the batch has been processed, the door is opened to discharge the shrunken material.

Although the exact mechanism by which the gas escapes from the cells is not known for certain, it is believed that the heating of the thermoplastic material breaks down the walls of the cells and permits the gas to escape through them.

The reduction in volume provided by the system is significant. For example, four cubic feet of polystyrene foam particles having the shape of a figure eight is reduced to a volume on the order of 85 to 115 cubic inches, a reduction of about 60 to 80 times. This amount of material is processed in approximately 2.5 minutes, which corresponds to a rate of approximately 96 cubic feet per hour.

The throughput of the system can be increased by increasing the depth of the chute and by increasing the size and/or the number of the heat sources. As the size of the system is increased, however, it is important that the heat sources still be arranged so that the hot air reaches all of the particles in the material to be densified. If desired, other types of heat sources can be utilized instead of the electrically energized hot air blowers shown in FIG. 1. For example, a gas burner can be employed to produce a hot air stream, or the foam particles can be heated with superheated steam if the steam is pressurized to increase its temperature to the range of 300°-350° F. It might also be possible to heat the foam material in a convection oven or to heat it with infrared radiation provided it is tumbled or stirred to expose all of the particles to the radiation.

While the invention works particularly well with particles having the configuration of a three dimensional figure eight, it can also be used very effectively with other shapes of loose fill materials, e.g. "peanuts", "shells", etc., and other products made of thermoplastic foam. However, it works particularly well with the figure eight shape because the openings in the figure eight facilitate the flow of hot air to the cells throughout the material.

Figure 2:
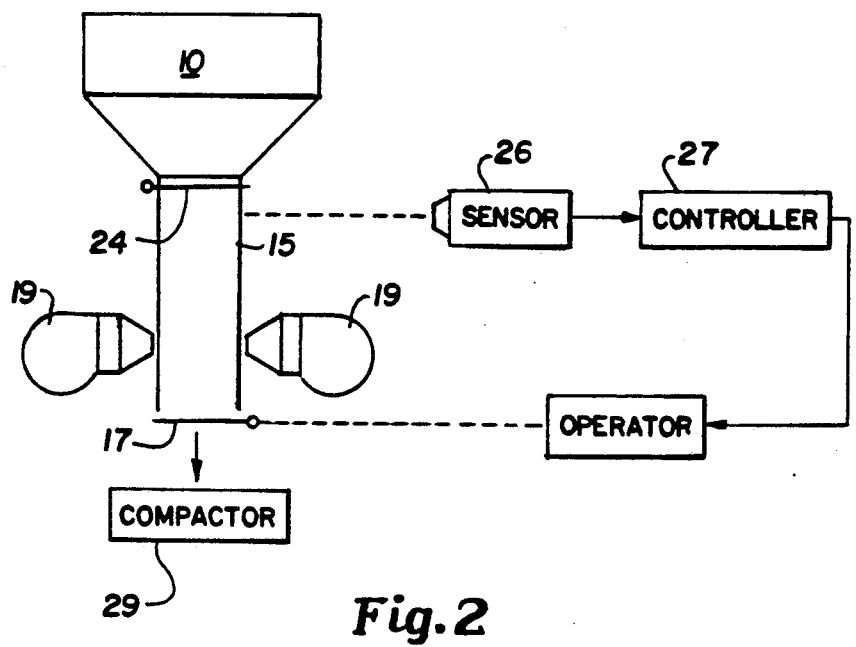
FIG. 2 is a schematic illustration of another embodiment of a system according to the invention.

The embodiment illustrated in FIG. 2 is generally similar to the embodiment of FIG. 1, and like reference numerals designate corresponding elements in the two figures. The embodiment of FIG. 2, however, has an upper gate 24 for controlling the flow of material from the hopper to the chute. For ease of illustration, this gate is shown as a hinged door, but in practice it can be any suitable type of gate such as a finger gate having a plurality of horizontally extensible and retractable fingers which intermesh to form a closure.

The embodiment of FIG. 2 also has a sensor 26 for detecting the absence of material in the upper portion of the chute and a programmable controller 27 which controls the operation of the door 17 at the lower end of the chute. The controller responds to a signal from the sensor when all of the material has passed through the upper portion of the chute and, after an interval of time sufficient to process the material in the chute, closes the door to discharge the processed material from the chute.

The embodiment of FIG. 2 also includes a compactor 29 which receives the densified material discharged through door 17 and compacts it by compressing the particles of the heat softened material together to further reduce the volume of the material. The compactor typically reduces the volume the heated material by an additional factor of 2-3, providing an overall densification on the order of 120 to 150 times. The compactor can be of any suitable type and can, for example, be mechanically, hydraulically or pneumatically operated.

In operation, lower door 17 is closed, and the material to be processed is poured into the hopper. Gate 24 is opened if it is not open already to pass the material to the chute, and the heat sources are energized to densify the material in the lower portion of the chute as in the embodiment of FIG. 1. As the material in the lower portion of the chute is densified, the material above it falls into the heat zone and is likewise processed. When a desired amount of material has been processed, gate 24 is closed to interrupt the flow of material into the chute. When the absence of material in the upper portion of the chute is detected by the sensor, controller 27 starts a timing interval, and at the end of this interval door 17 is opened, delivering the densified material which has collected at the bottom of the chute to the compactor. Thereafter, door 17 is closed and gate 24 is open to resume the flow of material into the chute. This system provides a semicontinuous operation in that the material is processed continuously in successive batches.

If desired, the system can be operated in a fully continuous mode by eliminating the upper gate and replacing the lower door with rollers or other suitable means for passing the densified materials but not the larger unprocessed materials.

Figure 3:
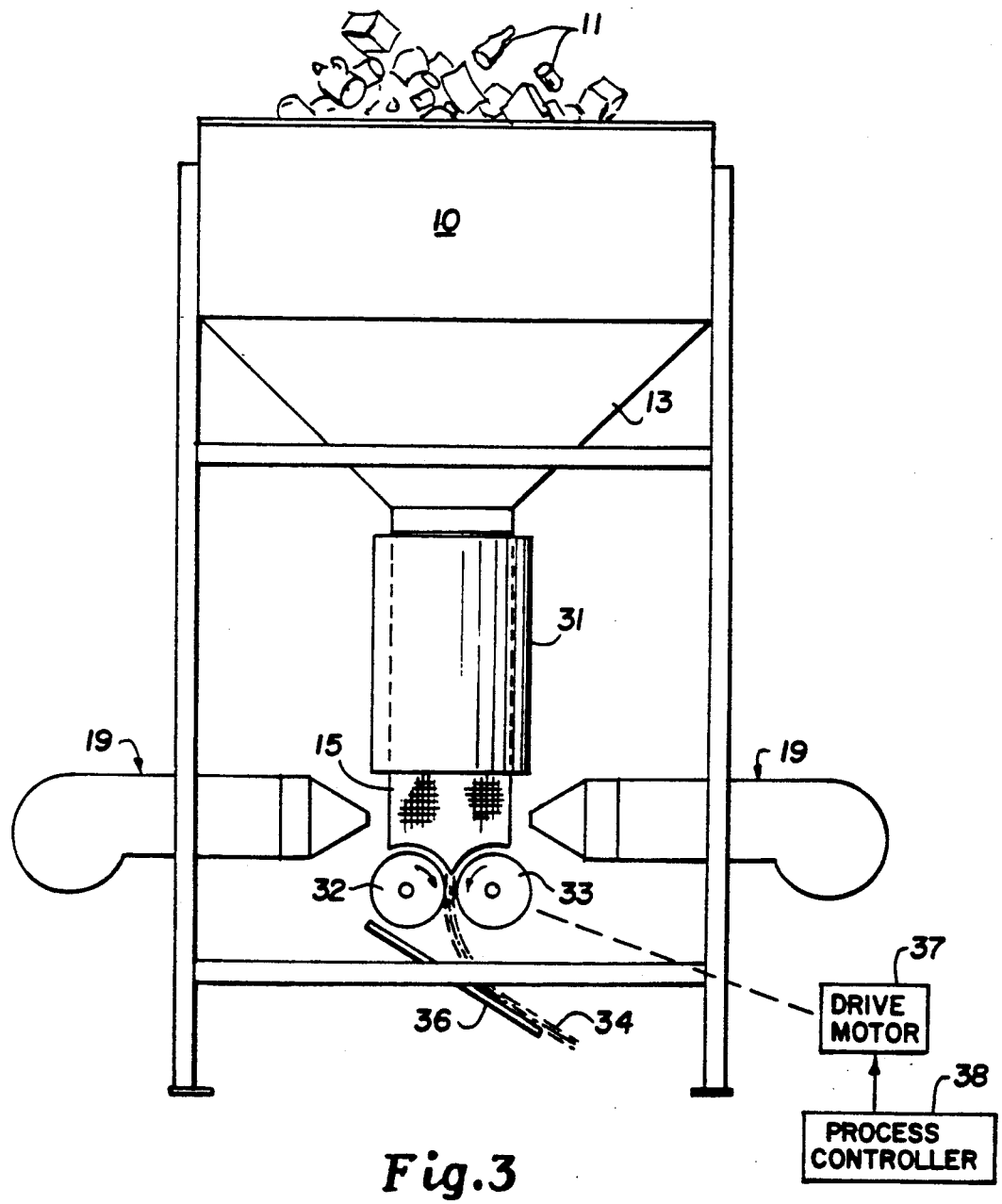
FIG. 3 is a schematic illustration of another embodiment of a system according to the invention.

The embodiment illustrated in FIG. 3 generally similar to the embodiments of FIGS. 1 and 2, and like reference numerals designate corresponding elements in this figure as well. The embodiment of FIG. 3 is, however, particularly suitable for use in densifying the thermoplastic foam from products such as food and beverage service items, although it can be used for loose fill packing materials, larger blocks and other foam materials as well. As in the embodiments of FIGS. 1 and 2, larger pieces of the material are preferably broken or ground into smaller pieces before being introduced into the hopper 10.

In the embodiment of FIG. 3, a generally cylindrical enclosure 31 surrounds the upper portion of the chute and prevents rising hot air from leaving the chute prematurely, thus assuring maximum heat transfer to the particles of material within the chute. The enclosure is fabricated of an insulative material such as mill board with a reflective inner surface formed by a layer of aluminum foil or other suitable reflective material. If desired, one or more windows can be provided in the enclosure to permit observation of the material within the upper portion of the chute. Such windows can be made of an optically transparent, heat resistant material such as Pyrex glass. The enclosure is preferably positioned close to the chute (e.g. ¼ inch away to keep as much hot air as possible inside the chute.

A pair of counter-rotating rollers 32, 33 are provided at the lower end of the chute to control the discharge of densified material from the chute. The rollers are positioned with the confronting portions of their surfaces approximately ¼ inch apart to permit the softened and densified material, but not the unprocessed material, to pass between the same. The densified material is discharged from the rollers in the form of a softened ribbon 34 having a width corresponding to that of the chute and is guided away from the rollers by an inclined deflector plate 36. The densified material hardens shortly after leaving the rollers and can be ground up or otherwise processed as desired.

The surfaces of the rollers are preferably coated with a material such as silicone to prevent the densified material from sticking thereto, and the lower end of the chute is contoured to match the rollers to prevent the material from escaping between the chute and the rollers.

The rollers are driven in counter rotating fashion by a suitable motor or motors 37. In the embodiment illustrated in FIG. 3, the rollers turn at a substantially constant speed when actuated, and the length of time the material remains in the chute and is exposed to the hot air is controlled by operating the rollers in a cyclical fashion. In this particular embodiment, operation of the drive motor is controlled by a process controller 38, which is programmable to provide optimum heating and discharge times for different materials. For food and beverage service items, the rollers might, for example, operate for 1½ seconds with 5 seconds between successive discharges, whereas for loose fill packing materials, they might operate for 3 seconds with 5 seconds between discharges.

Alternatively, the rollers can be driven continuously by a variable speed motor, with the speed of the motor being adjusted to keep the material in the chute for the optimum time for densification. The motor speed can be adjusted manually in accordance with visual observation of the discharging material, or it can be regulated by a suitable control system.

The invention has a number of important features and advantages. The heating alone reduces the volume of the foam material by a factor on the order of 60 to 80 times, and when the heated material is compacted, the reduction in volume is on the order of 120 to 150 times. This significantly reduces the volume of such materials to be disposed of in land fill sites and makes it economically feasible to transport the material to a facility for recycling.

It is apparent from the foregoing that a new and improved system and method for densifying thermoplastic foam materials have been provided. While only certain presently preferred embodiments have been described in detail, as will be apparent to those familiar with the art, certain changes and modifications can be made without departing from the scope of the invention as defined by the following claims.

I claim:

1. In a system for densifying an expanded plastic foam material having a plurality of gas-filled cells: a hopper for receiving the material to be densified, a chute having a perforate side wall extending in a downward direction from the outlet of the hopper, means positioned near the lower end of the chute for directing heated air through the perforate side wall and the material in the lower portion of the chute to heat the material to expel the gas from the cells and shrink the material, and an insulative enclosure surrounding an upper portion of the chute to prevent rising hot air from escaping from the chute.

2. In a system for densifying an expanded plastic foam material having a plurality of gas-filled cells: a hopper for receiving the material to be densified, a chute having a perforate side wall extending in a downward direction from the outlet of the hopper, means positioned near the lower end of the chute for directing heated air through the perforate side wall and the material in the lower portion of the chute to heat the material to expel the gas from the cells and shrink the material, a pair of rollers spaced apart at the lower end of the chute by a distance less than the size of a particle of material to be densified, and means for rotating the rollers in opposite direction to remove heated and shrunk material from the chute.

3. In a method of densifying an expanded plastic foam material having a plurality of gas-filled cells: receiving the material to be densified in a hopper having a sloping wall and an outlet toward a lower end of the sloping wall, delivering the material through the opening from the hopper to a chute having a perforated side wall, and directing heated air through the perforate side wall to heat the material in the chute so as to expel the gas from the cells and thereby shrink the material.

4. In a method of densifying an expanded plastic foam material having a plurality of gas-filled cells: receiving the material to be densified in a hopper, delivering the material from the hopper to a chute having a perforate side wall, directing heated air through the perforate side wall to heat the material in the chute so as to expel the gas from the cells and thereby shrink the material, and surrounding an upper portion of the chute with an insulative enclosure to prevent rising hot air from escaping from the chute.

5. In a system for densifying an expanded plastic foam material having a plurality of gas-filled cells: a station for receiving the material to be densified, a heating station, means for conveying the material from the receiving station to the heating station, means for blowing heated air through the material at the heating station to soften the material without melting it, and means for compacting the heat softened material to reduce the volume of the material.

6. In a system for densifying an expanded plastic foam material having a plurality of gas-filled cells: a hopper for receiving the material to be densified, a chute having a perforate side wall extending in a downward direction from the outlet of the hopper, a closure at the lower end of the chute for holding the material in the chute, and means positioned near the lower end of the chute for directing heated air through the perforate side wall and the material in the lower portion of the chute to heat the material to expel the gas from the cells and shrink the material, thereby allowing successive portions of the material to drop into the lower portion of the chute to be heated and shrunk.

7. The system of claim 6 wherein the chute is fabricated of a material having a relatively low thermal conductivity to which the heated material does not readily adhere.

8. The system of claim 7 wherein the chute is fabricated of a Teflon coated fiberglass mesh.

9. The system of claim 6 including a gate at the upper end of the chute for controlling delivery of the material from the hopper to the chute, means for opening the closure at the lower end of the chute to discharge a batch of the material from the chute after it has been heated and shrunk, and means for closing the gate while the material is discharged to prevent the delivery of material to the chute when the closure is open.

10. The system of claim 9 including a sensor for detecting the absence of material in the upper portion of the chute, and means responsive to the sensor for opening the closure a predetermined time after the absence of material is detected.

11. The system of claim 6 wherein the closure at the lower end of the chute comprises a pair of rollers spaced apart by a distance less than the size of a particle of material to be densified, and means for rotating the rollers in opposite direction to discharge the heated and shrunk material between the rollers.

12. In a method of densifying an expanded plastic foam material having a plurality of gas-filled cells, the steps of: collecting the material to be densified in a hopper having a sloping wall with an outlet toward a lower end thereof, delivering the material from the hopper through the outlet to a vertically extending chute having a perforate side wall, and blowing hot air through a lower portion of the perforate side wall and the material in a lower portion of the chute to heat the material and expel the gas from the cells and thereby shrink the material in the lower portion of the chute to a reduced volume.

13. In a method of densifying an expanded plastic foam material having a plurality of gas-filled cells: receiving the material to be densified in a hopper, delivering the material from the hopper to a chute having a perforate side wall, directing heated air through the perforate side wall to heat the material in the chute so as to expel the gas from the cells and thereby shrink the material, collecting the heated and shrunk material on a pair of rollers which are spaced apart by a distance less than the size of a particle of material to be densified, and turning the rollers to discharge the heated and shrunk material between the rollers.

14. In a system for densifying an expanded plastic foam material having a plurality of gas-filled cells: a station for receiving the material to be densified, a heating station, means comprising a vertically extending chute having a cylindrical side wall of perforate material for conveying the material from the receiving station to the heating station, and means at the heating station for blowing heated air through the side wall and the material in the chute to heat the material to expel the gas from the cells and thereby shrink the material to a reduced volume.

15. In a method of densifying an expanded plastic foam material having a plurality of gas-filled cells, the steps of: blowing heated air through the material to soften the material without melting it, and compacting the heat softened material to reduce the volume of the material.

16. In a method of densifying an expanded plastic foam material having a plurality of gas-filled cells, the steps of: receiving the material to be densified in a hopper having a sloping wall and an outlet toward a lower end of the sloping wall, delivering the material from the hopper through the outlet to a vertically extending chute having a perforate side wall, directing heated air through the perforate side wall near the lower end of the chute to shrink the material in the lower portion of the chute, allowing successive portion of the material to drop into the lower portion of the chute to be heated and shrunk and collecting the material which has been heated and shrunk in the lower portion of the chute.

17. In a method of densifying an expanded plastic foam material having a plurality of gas-filled cells, the steps of: receiving the material to be densified in a hopper, delivering the material from the hopper to a vertically extending chute having a perforate side wall, directing heated air through the perforate side wall near the lower end of the chute to shrink the material in the lower portion of the chute, allowing successive portions of the material to drop into the lower portion of the chute to be heated and shrunk, collecting the material which has been heated and shrunk in the lower portion of the chute, monitoring the upper portion of the chute to detect the absence of material in the upper portion, and discharging the collected material from the lower portion of the chute a predetermined time after the absence of material in the upper portion is detected.

18. In a system for densifying an expanded plastic foam material having a plurality of gas-filled cells: a hopper for receiving the material to be densified, said hopper having a sloping wall and an outlet positioned toward a lower end of the sloping wall, a chute having a perforated cylindrical side wall extending in a downward direction from the outlet of the hopper, and means positioned near the lower end of the chute for directing heated air through the perforated side wall and the material in the lower portion of the chute to heat the material to expel the gas from the cells and shrink the material.

* * * * *